Feb. 16, 1960 P. J. DI LAURO 2,924,889
EDUCATIONAL APPARATUS
Original Filed Sept. 10, 1956
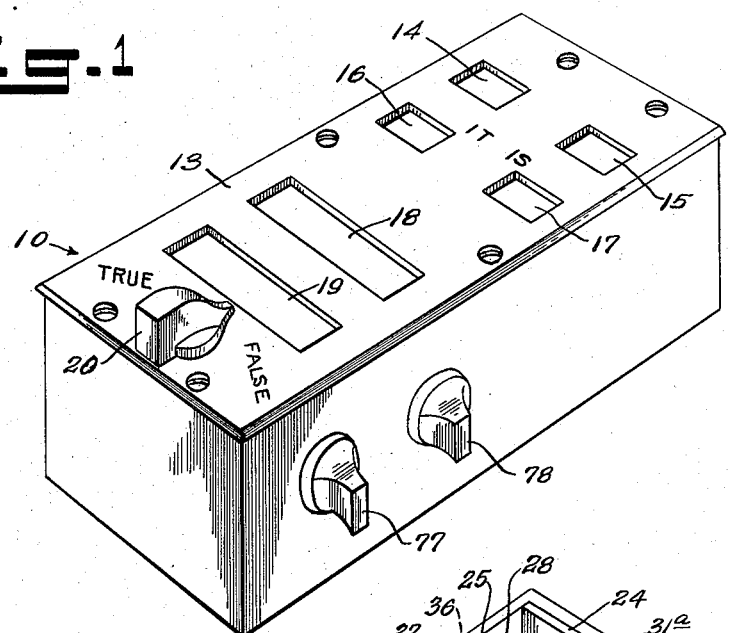
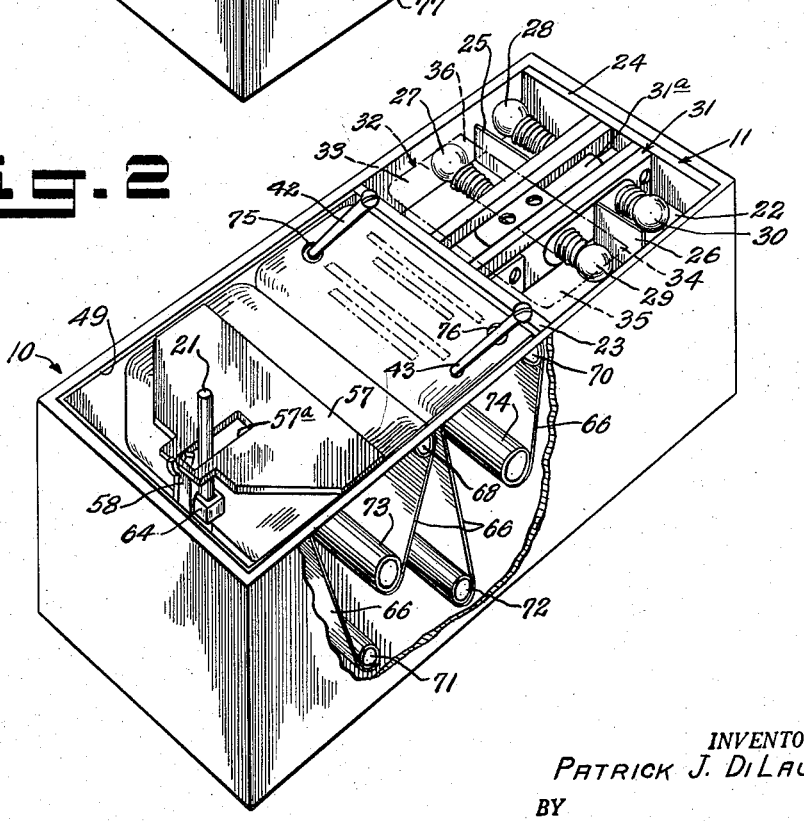
INVENTOR.
PATRICK J. DI LAURO
BY
H. G. Manning
ATTORNEY Feb. 16, 1960 P. J. DI LAURO 2,924,889
EDUCATIONAL APPARATUS
Original Filed Sept. 10, 1956 3 Sheets-Sheet 2
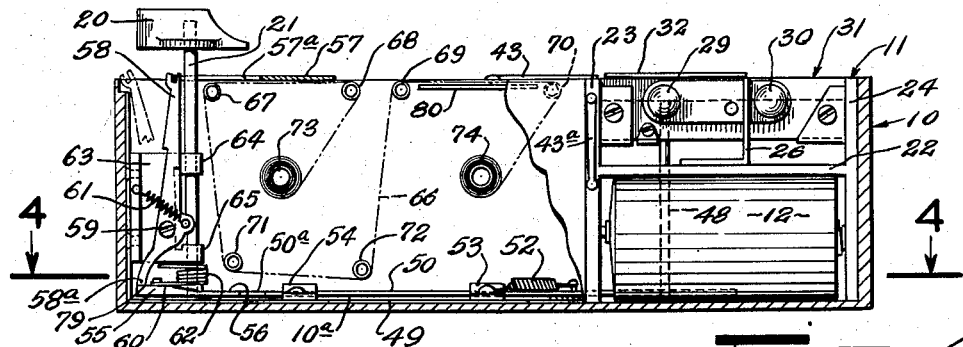
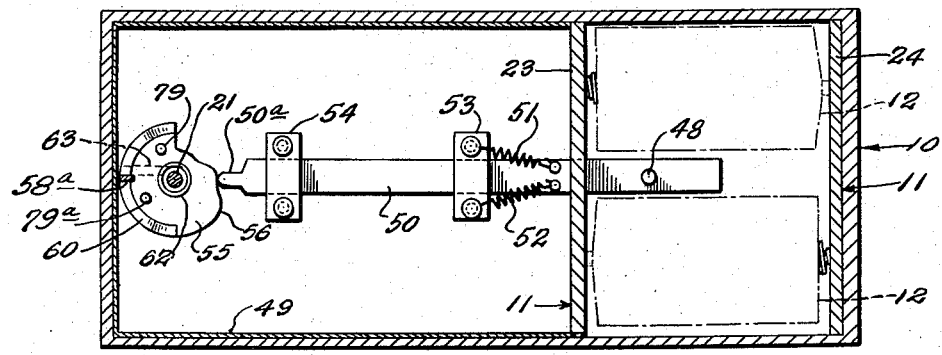
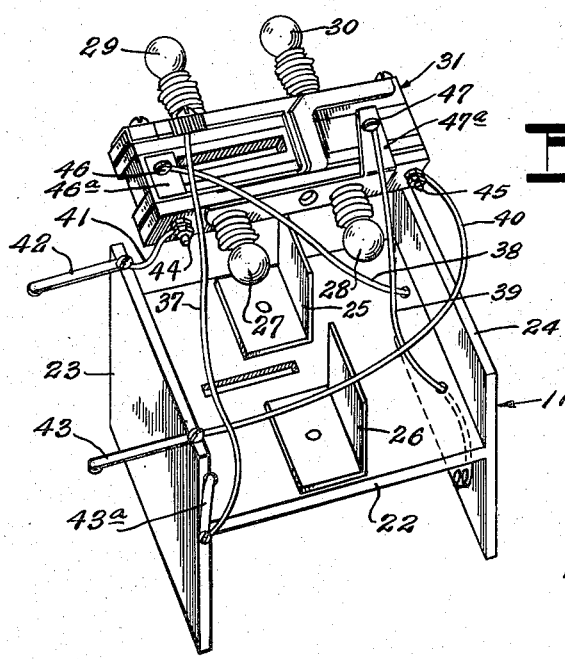
INVENTOR.
PATRICK J. DI LAURO
BY
H. G. Manning
ATTORNEY Feb. 16, 1960 P. J. DI LAURO 2,924,889
EDUCATIONAL APPARATUS
Original Filed Sept. 10, 1956 3 Sheets-Sheet 3
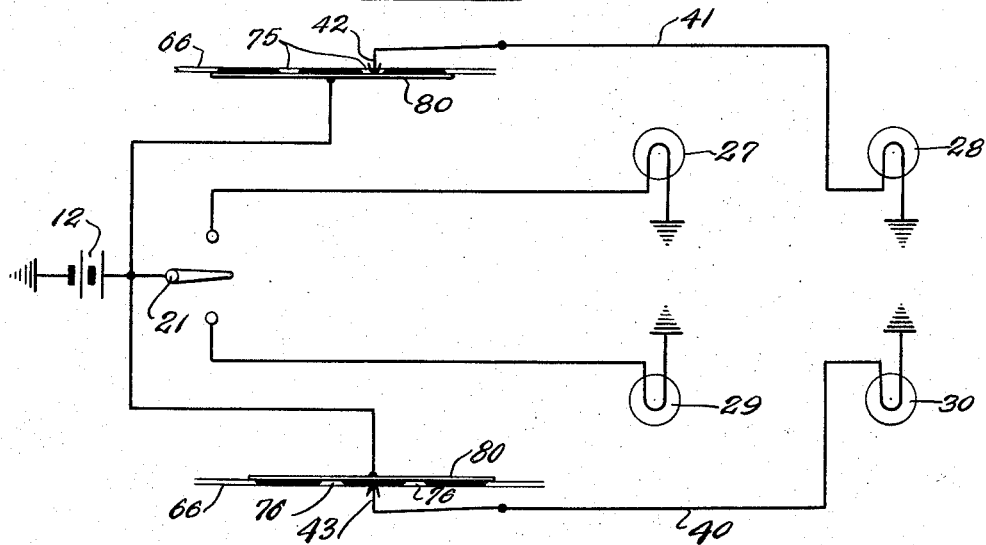
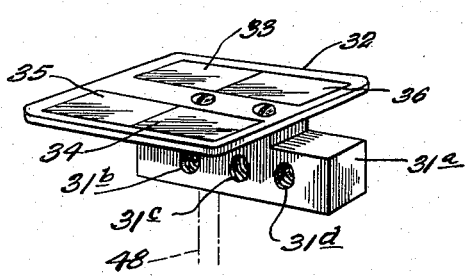
INVENTOR.
PATRICK J. DI LAURO
BY
H. G. Manning
ATTORNEY

United States Patent Office 2,924,889
Patented Feb. 16, 1960

2,924,889
EDUCATIONAL APPARATUS

Patrick J. Di Lauro, Waterbury, Conn.

Continuation of application Serial No. 608,854, September 10, 1956. This application July 3, 1959, Serial No. 824,817

1 Claim. (Cl. 35—9)

This invention relates to an educational apparatus, and more particularly to a device for indicating whether a set of educational questions are correct or incorrect.

One object of the present invention is to provide an apparatus of the above nature having a single continuous tape which is manually fed from a feed reel to a take up reel and caused to pass under a "question" window and an "answer" window, by the manipulation of a pair of rotary buttons on the side of the cabinet, and which also has means to indicate whether the opinions as to said questions are "right" or "wrong."

A further object is to provide a vertical switch button shaft which causes a slide to move longitudinally over four rectangularly arranged battery-operated lamp bulbs, said slide having transparent green and red colored corner sections to indicate whether the operator's opinions are correct or incorrect.

Another object is to provide an interchangeable roll of tape having sets of questions and answers on opposite sides respectively, and having staggered perforations on the edges thereof through which a pair of metallic spring fingers are adapted to make contact with an underlying metallic plate, which roll is prepared in advance to correspond with the educational level of the persons using the apparatus.

A further object is to provide an educational apparatus of the above nature which will be simple in construction, inexpensive to manufacture, easy to manipulate, compact, ornamental in appearance, and very efficient and durable in use.

With these and other objects in view, there has been illustrated on the accompanying drawings, one form in which the invention may conveniently be embodied in practice.

In the drawings:

Fig. 1 represents a perspective view of the cabinet, as viewed from the top thereof.

Fig. 2 is a similar perspective view of the same, with the cover plate removed, and with the side of the cabinet partly broken away to illustrate the mechanism therewithin.

Fig. 3 is a side view, partly in section, and partly broken away, illustrating the construction of the ends of the apparatus.

Fig. 4 is a top view of the cabinet, with the cover plate and tape roll removed, to show the appearance of the apparatus in the lower part of the cabinet.

Fig. 5 is a perspective view of the detachable insert member located at the rear of the cabinet for containing the illuminating bulbs and the electrical connections therefor.

Fig. 6 is a schematic electrical wiring diagram of the apparatus.

Fig. 7 is a perspective view of the sliding switch member and transparent colored slide.

Referring now to the drawings, in which like reference numerals denote corresponding parts throughout the several views, the numeral 10 indicates a rectangular cabinet having at one end thereof an illuminating insert 11 for detachably holding a pair of dry cells 12, 12.

The numeral 13 indicates a cover plate detachably secured to the top of the cabinet, and having four small rectangular rear windows 14, 15, 16 and 17.

The cover plate 13 is also provided with a pair of larger rectangular windows 18 and 19, indicating "question" and "answer" respectively, said windows being located at the front of the cabinet.

In order to indicate whether the operator believes the questions to be "true" or "false," provision is made of a rotary switch operating button 20 located on the top of the cabinet at the front end thereof (Fig. 1), said button being mounted upon the upper end of a vertical cam shaft 21.

The insert 11 is provided with a horizontal shelf 22 and a pair of vertical end walls 23, 24, as clearly shown in Fig. 5. Mounted upon the shelf 22 are a pair of angular light shields 25, 26 for four light bulbs 27, 28, 29 and 30, mounted in a lamp block 31. The shell contacts of all of these lamp bulbs are grounded.

Provision is also made of a top slide 32 having a pair of diagonally arranged transparent green corner sections 33, 34, and a similar pair of diagonally arranged transparent red corner sections 35, 36, said slide 32 being rigidly connected to a sliding double throw switch 31a which is operated by the sliding of an upstanding post 48.

In order to connect the bulbs 27, 28, 29 and 30 to the operating parts of the apparatus, provision is made of five wires 37, 38, 39, 40, 41 arranged as shown in Fig. 5. The wires 38 and 39 are joined by binding screws 46, 47 to connecting plates 46a and 47a respectively.

Provision is also made of a pair of upper horizontal flexible contact strips 42, 43 which are connected to the opposite wires 41, 40 respectively, said strips having circular contact buttons under the tips thereof, as clearly shown in Fig. 5. The numeral 43a (Figs. 3 and 5) indicates a vertical flexible contact strip connected to the wire 37. Provision is also made of a pair of binding posts 44, 45 (Fig. 5) connected to the wires 41 and 40 respectively.

The vertical post 48 is rigidly mounted upon the rear end of a narrow slide member 50 which is located beneath a metallic roll insert 49 located at the forward end of the cabinet.

The slide member 50 is urged forwardly, or to the left, as viewed in Fig. 4, by means of a pair of diverging coil springs 51, 52, each of which is connected at its rear end to the slide 50, and at its forward end to a cross-bracket 53 secured to the bottom of the roll insert 49. Three conductive cross connector springs 31b, 31c and 31d are provided in the sliding switch 31a, as shown in Fig. 7.

The slide 50 is adapted to move freely within a guide bracket 54, and has a reduced forward end 50a which is engageable by a rotary arcuate horizontal plate cam 55 mounted upon the bottom of the cam shaft 21, previously mentioned.

The rotary forward cam 55 is provided with a cam edge 56 which is adapted to engage the reduced end 50a of the slide 50 for causing said slide to move rearwardly when the button 20 is turned counter-clockwise and forwardly when said button 20 is turned clockwise.

Provision is also made of an "answer" slide 57 located directly under the cover plate 13, as seen in Fig. 2, and having a longitudinal slot 57a which freely embraces the post 21. The "answer" slide 57 is engaged by the top of a vertical lever 58 pivoted at 59 (Fig. 3) in an upstanding guide frame 63, and engaged at its lower end 58a with a semicircular upstanding flange 60 on the front of the cam 55, as clearly shown in Fig. 3 of the drawings.

The front cam flange 60 of arcuate shape has its ends reduced in height, and the vertical lever 58 is urged in a counterclockwise direction (as shown in Fig. 3) by an inclined coiled pull spring 61 connected to the frame 63. The bottom of the post 21 is surrounded by a coil spring 62 (Fig. 3) which causes the cam 55 to return to a neutral position after it has been operated in a clockwise or counterclockwise direction, respectively.

The guide frame 63 is provided with a pair of vertically spaced bearings 64, 65 for the post 21.

The questions and answers are located on opposite sides of a roll of tape 66 which is adapted to be passed around four horizontal top rollers 67, 68, 69, and 70, and a pair of horizontal bottom rollers 71, 72, in the manner shown in Figs. 2 and 3.

The tape 66 is fed from a feed reel 73 to a take up reel 74, being threaded around the rollers 68, 67, 71, 72, 69, 70 as shown in the drawing, so that both the questions and the answers will be visible through the large forward windows 18, 19 in the cover plate.

The tape 66 is provided on its opposite edges with a plurality of spaced staggered circular contact holes 75, 76 (Fig. 2) and said tape is adapted to be advanced in opposite directions by means of a pair of horizontal manually operated turning buttons 77 and 78, respectively, located on the side of the cabinet (Fig. 1).

Provision is also made of a pair of vertical stop screws 79, 79a (Fig. 4) for limiting the rotation of the cam 55, by engagement with the guide frame 63. Moreover, a conductive plate 80 (Fig. 3) at the top of the roll insert 49, and located under the tape 66, is engageable by the spring fingers 42 and 43, whenever one of the staggered holes 75 or 76 comes into alignment with a contact button on the tip of one of said fingers.

One example of a question which may be printed on the top of the tape is: "Is Nippon another name for India?" The correct answer to this question is "False, it's another name for Japan," which answer is printed on the reverse side of the tape at a proper spacing from the question, so that it will be visible through the front window 19 when the "true" or "false" button 20 is turned to either of its extreme positions.

The post 48 is rigidly connected at its upper end to the slide switch 31a (Fig. 7). The circuit connections are such that when the operator turns the button 20 counterclockwise, to indicate that he thinks the question is "true," the light will show green through the transparent section 33, under the left windows 14 or 16, if his opinion is actually correct, and red from the transparent section 36 if incorrect. If the button 20 is turned clockwise to indicate the operator's opinion that the question is "false," then the section 34 will show green through the right windows 17 and 15 if he is correct, and the section 35 will show red through said windows 17 and 15 if he is incorrect. It will be understood that in either case, the illumination of the green transparent section indicates that the operator is right in his guess, and the illumination of the red transparent section indicates that his guess is wrong.

*Operation*

In the operation of the apparatus herein disclosed, the "question" window 18 will be open at all times, but the "answer" window 19 will normally be covered by the slide member 57. When a player makes his decision as to whether the question is true or false, he will turn the switch button 20 manually at the top of the cabinet about its shaft 21 either clockwise or counterclockwise, indicating that he believes the question is "true" or "false" respectively.

When the button 20 is turned either clockwise or counter-clockwise, an electric circuit will be closed, whenever one of the staggered holes 75 or 76 in the edges of the roll of tape 66, is under a button of the flexible switch contact strips 42 or 43, causing the lamps on the right or left side of the insert 11 respectively to light up. Moreover, when the button 20 reaches its extreme travel in either direction, the lower end of the lever 58 will drop into the depressed ends of the cam edge and due to the action of the coiled spring 62 the slide 57 will be moved toward the left or forwardly as viewed in Figures 1 and 2, to uncover the answer.

It will be understood the "true" or "false" button 20 will normally be returned to its central neutral position, by means of the coil spring 62 surrounding the shaft 21, the motion of said button being limited by the stop screws 79, 79a.

To further clarify the operation of the apparatus, it may be stated that the sliding combination switch 31a and the color slide 32 rigidly connected therewith, will be moved rearwardly when the button 20 is turned in a counter-clockwise direction. When the button 20 is turned to a clockwise direction, the cam 55 and the springs 51, 52 will allow the slide 50 to move forwardly, causing the slides 31a and 32 to also move forwardly. When the slide 31a has reached its full travel, the switch will be turned on to connect the wire 37 to the vertical flexible contact strip 43a, which is electrically connected with the metallic roll insert 49, thus energizing the conductive plate 80 located under the tape 66.

This application is a continuation of my prior application, Serial No. 608,854, filed September 10, 1956, entitled "Educational Apparatus," now abandoned.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claim.

Having thus fully described the invention, what is claimed as new, and for which it is desired to secure Letters Patent is:

In an educational apparatus, a cabinet within which is mounted a roll of tape carrying on opposite sides a series of questions and answers respectively, a cover member for said cabinet having "question" and "answer" windows near the forward end thereof, a horizontal feed roll and a horizontal take up roll connected with said tape, the edges of said tape having staggered rows of spaced apertures, a hand operated knob rigidly mounted on a vertical shaft and located above said cover member, an "answer" slide operatively connected with said knob, normally covering said "answer" window but uncovering it whenever said knob is turned in either direction, a metallic conductive plate under said cover member, a pair of downwardly pressing spring fingers located above said tape and in alignment with said rows of apertures, respectively, a transparent slide having differently colored diagonally arranged sections at the rear of said cover member and movable forwardly or rearwardly in response to the turning of said knob, a rotary cam for moving said slide rearwardly when said knob is turned counter-clockwise and forwardly when said knob is turned clockwise, and electrically operated illuminating means below the colored sections of said slide and cooperating therewith to indicate whether the operator's opinion is correct or incorrect.

References Cited in the file of this patent
UNITED STATES PATENTS

| | | |
|---|---|---|
| 1,136,673 | Heron | Apr. 20, 1915 |
| 2,030,175 | LeFevre | Feb. 11, 1936 |
| 2,496,767 | Zuercher | Feb. 7, 1950 |
| 2,546,789 | Schielke | Mar. 27, 1951 |
| 2,687,579 | Davis | Aug. 31, 1954 |